United States Patent
Kim et al.

(10) Patent No.: US 11,239,890 B2
(45) Date of Patent: Feb. 1, 2022

(54) WIRELESS COMMUNICATION APPARATUS CONFIGURED TO PERFORM BEAM SWEEPING OPERATION AND METHOD OF OPERATING THE SAME

(71) Applicant: SAMSUNG ELECTRONICS CO., LTD., Suwon-si (KR)

(72) Inventors: Joontae Kim, Suwon-si (KR); Junho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 141 days.

(21) Appl. No.: 16/686,336

(22) Filed: Nov. 18, 2019

(65) Prior Publication Data

US 2020/0169306 A1    May 28, 2020

(30) Foreign Application Priority Data

Nov. 28, 2018  (KR) .................. 10-2018-0150084
Apr. 19, 2019  (KR) .................. 10-2019-0046084

(51) Int. Cl.
*H04B 7/06*   (2006.01)
*H04B 7/0456* (2017.01)
*H04W 72/04*  (2009.01)

(52) U.S. Cl.
CPC ......... *H04B 7/0617* (2013.01); *H04B 7/0456* (2013.01); *H04W 72/046* (2013.01)

(58) Field of Classification Search
CPC ........... H04W 72/042; H04W 72/0446; H04W 76/27; H04L 5/0053; H04L 1/1812

USPC ........................................................ 370/329
See application file for complete search history.

(56) References Cited

U.S. PATENT DOCUMENTS

| | | |
|---|---|---|
| 8,619,886 B2 | 12/2013 | Nsenga et al. |
| 8,781,015 B2 | 7/2014 | Lee et al. |
| 8,848,818 B2 | 9/2014 | Kim et al. |
| 9,001,879 B2 | 4/2015 | Maltsev et al. |
| 9,929,791 B2 | 3/2018 | Seol et al. |

(Continued)

FOREIGN PATENT DOCUMENTS

| | | |
|---|---|---|
| KR | 10-2012-0079926 | 7/2012 |
| KR | 10-2013-0017567 | 2/2013 |
| KR | 10-1664421 | 10/2016 |

*Primary Examiner* — Shuwang Liu
*Assistant Examiner* — Gina M Mckie
(74) *Attorney, Agent, or Firm* — F. Chau & Associates, LLC

(57) ABSTRACT

A method of operating a wireless communication apparatus including an antenna array including a plurality of sub-arrays includes sweeping a receiving beam formed in each of the sub-arrays such that the receiving beam has a plurality of receiving beam patterns at a respective plurality of sweeping positions, and receiving a signal through the antenna array at each of the sweeping positions, generating base channel matrix information including channel matrices corresponding to the receiving beam patterns for each of the sub-arrays, based on the signal, performing a digital sweeping operation on at least one group combination, which is determined using the base channel matrix information, and generating supplemental channel matrix information, and selecting a receiving beam pattern of the antenna array using the base channel matrix information and the supplemental channel matrix information.

17 Claims, 14 Drawing Sheets

(56) References Cited

U.S. PATENT DOCUMENTS

| | | |
|---|---|---|
| 2005/0037799 A1 | 2/2005 | Braun et al. |
| 2012/0230380 A1 | 9/2012 | Keusgen et al. |
| 2013/0039401 A1 | 2/2013 | Han et al. |
| 2013/0301454 A1* | 11/2013 | Seol .................... H04B 7/0695 |
| | | 370/252 |
| 2015/0188682 A1 | 7/2015 | Noh et al. |
| 2016/0127919 A1* | 5/2016 | Hui ....................... H04W 16/28 |
| | | 342/371 |
| 2017/0208613 A1* | 7/2017 | Nam .................... H04B 7/0634 |
| 2018/0083677 A1 | 3/2018 | Tong et al. |
| 2019/0159042 A1* | 5/2019 | Tomeba ................... H04B 7/06 |

\* cited by examiner

WIRELESS COMMUNICATION APPARATUS CONFIGURED TO PERFORM BEAM SWEEPING OPERATION AND METHOD OF OPERATING THE SAME

CROSS-REFERENCE TO RELATED APPLICATIONS

This application claims the benefit of Korean Patent Application Nos. 10-2018-0150084 and 10-2019-0046084, respectively filed on Nov. 28, 2018 and Apr. 19, 2019, in the Korean Intellectual Property Office, the disclosures of which are incorporated herein by reference in their entireties.

TECHNICAL FIELD

This disclosure relates generally to a wireless communication apparatus and more particularly to a wireless communication apparatus that performs a beam sweeping operation for improving communication performance.

DISCUSSION OF THE RELATED ART

Recent proposals for a fifth-generation (5G) communication system (5G radio access technology) aim to improve performance of the commercially widespread long-term evolution (LTE) and LTE advanced (LTE-A), by providing an ultrahigh-speed data service of several Gbps using an ultra-wideband bandwidth of 100 MHz or more. Considering the technical challenge of achieving ultra-wideband communication over frequency bands of several hundred MHz or several GHz, which are used in LTE and LTE-A, frequencies of 6 GHz or more are being considered in the 5G communication system. For example, a technique of increasing a transmission rate using a millimeter (mm) wave band is being considered for 5G, with potential bands including the 28 GHz band (26.5-29.5 GHz) and the 60 GHz band (57-71 GHz). However, since the path loss of radio waves is proportional to frequency, relatively high path loss that occurs with mm waves may reduce the service area for communication with a given base station.

In an effort to prevent such service area reduction, a beamforming technique for increasing a range of the radio waves by generating directional beams using a plurality of antennas has been proposed for 5G. The beamforming technique may be applied to each of a transmission device (e.g., a base station) and a receiving device (e.g., a terminal). The beamforming technique may not only expand the service area but also reduce interference due to the focusing of physical beams toward a target.

In a 5G communication system, a pointing direction of transmission beams of the transmission device should be aligned with a pointing direction of receiving beams of the receiving device to optimize the beneficial effect of the beamforming technique. Accordingly, research has been conducted into beamforming techniques that form such optimally pointing beams.

SUMMARY

Embodiments of the inventive concept provide a wireless communication apparatus, which may select a pattern of a receiving beam optimally aligned with any one of a plurality of transmission beams of a base station in a 5G wireless communication system, and a method of operating the wireless communication apparatus.

According to an aspect of the inventive concept, there is provided a method of operating a wireless communication apparatus including an antenna array including a plurality of sub-arrays. The method includes sweeping a receiving beam formed in each of the sub-arrays such that the receiving beam has a plurality of receiving beam patterns at a respective plurality of sweeping positions, and receiving a signal through the antenna array at each of the sweeping positions, generating base channel matrix information including channel matrices corresponding to the receiving beam patterns for each of the sub-arrays, based on the signal, performing a digital sweeping operation on at least one sub-array group, which is a group combination of the sub-arrays, which is determined using the channel matrix information, and generating supplemental channel matrix information, and selecting a receiving beam pattern of the antenna array using the base channel matrix information and the supplemental channel matrix information.

According to another aspect of the inventive concept, there is provided a method of operating a wireless communication apparatus including a plurality of antenna arrays. The method includes performing a beam sweeping operation using a first antenna array including a plurality of sub-arrays, from among the antenna arrays. The performing of the beam sweeping operation using the first antenna array includes controlling at least one of a phase and an amplitude of each of the sub-arrays of the first antenna array such that a receiving beam formed in the first antenna array has a plurality of receiving beam patterns at a respective plurality of beam sweeping positions, generating first channel matrix information including channel matrices corresponding to the receiving beam patterns for each of the sub-arrays, based on a signal received through the first antenna array, and performing a digital beam sweeping operation on at least one group combination of selected ones of the sub-arrays, where the group combination is determined by using the first channel matrix information, and generating first additional channel matrix information.

According to another aspect of the inventive concept, there is provided a wireless communication apparatus including a plurality of antenna arrays, each of which includes a plurality of sub-arrays, a plurality of radio-frequency (RF) chains connected to the plurality of antenna arrays, respectively, and a controller configured to process signals received from the antenna arrays. The controller controls at least one of phases and amplitudes of antenna elements of each of sub-arrays, based on a beamforming matrix, and performs an analog beam sweeping operation. The controller performs a digital beam sweeping operation considering receiving beam patterns that are formable by a group combination including the sub-arrays of the antenna arrays, using signals received in the analog beam sweeping operation.

BRIEF DESCRIPTION OF THE DRAWINGS

Embodiments of the inventive concept will be more clearly understood from the following detailed description taken in conjunction with the accompanying drawings in which like reference characters indicate like elements or features, wherein.

DETAILED DESCRIPTION OF EMBODIMENTS

Figure 1:
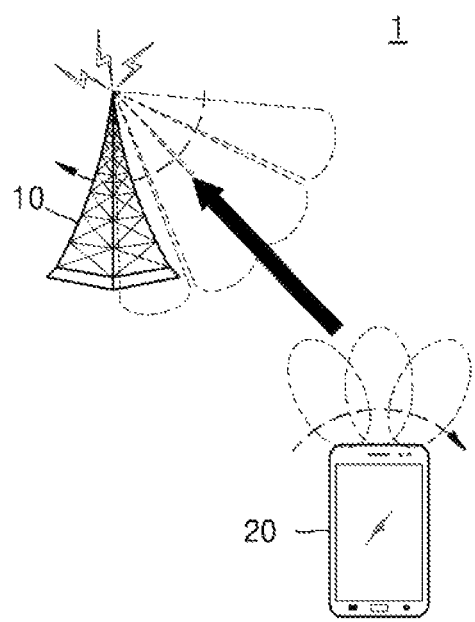
FIG. 1 is a block diagram of a wireless communication system according to an example embodiment.

Hereinafter, exemplary embodiments of the inventive concept will be described in detail with reference to the accompanying drawings.

Herein, the term a base station (BS) refers to an electronic apparatus that communicates with a wireless communication apparatus and assigns communication network resources to the wireless communication apparatus. Some examples of a base station include a "NodeB (NB)", an "eNodB (eNB)", a next-generation radio access network (NG RAN), an access point (AP), a wireless communication unit, a base station controller, and a node on a network. Hereinafter, the term "cell" will be used interchangeably with "base station".

A wireless communication apparatus may communicate with a base station or another wireless communication apparatus. A wireless communication apparatus may be referred to as a node, user equipment (UE), next-generation (NG) UE, a mobile station (MS), mobile equipment (ME), a device, or a terminal.

Other examples of a wireless communication apparatus include a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MPEG-1 audio layer 3 (MP3) player, medical equipment, a camera, and a wearable device. Further examples include a television (TV), a digital video disk (DVD) player, an audio player, a refrigerator, an air conditioner, a vacuum cleaner, an oven, a microwave oven, a washing machine, an air purifier, a set top box, a home automation control panel, a security control panel, a media box (e.g., Samsung HomeSync™, Apple TV™, or Google TV™), a game console (e.g., Xbox™ and PlayStation™), an electronic dictionary, an electronic key, a camcorder, or an electronic frame. Still further examples include various pieces of medical equipment (e.g., various pieces of portable medical measuring equipment (e.g., a blood glucose meter, a heart rate meter, a blood pressure meter, a clinical thermometer, or the like), magnetic resonance angiography (MRA), magnetic resonance imaging (MRI), computed tomography (CT), a camera, an ultrasonic device, or the like), a navigation device, a global navigation satellite system (GNSS), an event data recorder (EDR), a flight data, recorder (FDR), an automotive infotainment device, marine electronic equipment (e.g., a marine navigation system, a gyro compass, and the like), avionics, a security device, a heat unit for vehicles, an industrial or home robot, a drone, an automated teller machine (ATM) of financial institutions, a point of sales (POS) of stores, or Internet of Things (IoT) devices (e.g., a light bulb, a sensor, a sprinkler, a fire alarm, a thermostat, a street light, a toaster, exercise equipment, a hot water tank, a heater, a boiler, and the like). In addition, a wireless communication apparatus may be any of various types of multimedia systems capable of performing communication functions. Hereafter, a wireless communication apparatus may be interchangeably called a "wireless device".

FIG. 1 is a block diagram of a wireless communication system 1 according to an example embodiment. The wireless communication system 1 may include a base station 10 and a wireless device 20. Although FIG. 1 illustrates a single base station 10 and a single wireless device 20, the wireless communication system 1 may include various numbers of base stations and wireless devices. The base station 10 may be communicatively connected to the wireless communication apparatus 20 via a wireless channel and provide various communication services. The base station 10 may service all or some user traffic through a shared channel and collect and schedule state information (e.g., a buffer state, an available transmission power state, and a channel state) of the wireless device 20. The wireless communication system 1 may support a beamforming technique by using, e.g., orthogonal frequency division multiplexing (OFDM) as the radio access technology. Also, the wireless communication system 1 may support an adaptive modulation & coding (AMC) scheme for determining a modulation scheme and a channel coding rate in accordance with a channel state of the wireless device 20.

Further, the wireless communication system 1 may transmit and receive signals using a wide frequency sub-band within a frequency band encompassing 6 GHz or highere. For example, in the wireless communication system 1, a data transmission rate may be increased using a mm wave band, such as the 28-GHz band (26.5-29.5 GHz) or the 60-GHz band (57-71 GHz). In this case, since the mm wave band has relatively high signal attenuation vs. distance, to ensure coverage, the wireless communication system 1 may support a transceiving operation on the basis of directional beams generated using a multiple antenna technique. The wireless communication system 1 may be a system configured to support multiple-input and multiple-output (MIMO), with the base station 10 and the wireless device 20 each supporting a beamforming technique. The beamforming technique may be classified into a digital beamforming technique, an analog beamforming technique, and a hybrid beamforming technique. Hereinafter, an embodiment in which the wireless communication system 1 supports the hybrid beamforming technique will mainly be described. However, it will be appreciated that the inventive concept may also be applied to other beamforming techniques.

The wireless device 20 according to an example embodiment may perform a beam sweeping operation on receiving beams to enable directional beam-based transceiving operations. Herein, a beam sweeping operation may refer to a process of sequentially or randomly sweeping directional beams having a predetermined pattern, by each of the base station 10 and the wireless device 20. During or following beam sweeping, patterns of a transmission beam and a receiving beam of which pointing directions are determined to be aligned with each other, may be selected for subsequent communication of RF signals. Herein, the term "beam pattern" may be used to refer to either the shape of a main beam in a pencil beam antenna pattern, or, in some cases, to an antenna pattern over a region of space beyond that of the main beam (for example, regions of multiple main beams are possible with an inverted phase gradient applied across an array aperture). In the following discussion, for simplicity, the term "beam" will refer to the main beam of a pencil beam antenna pattern, and "beam pattern" will refer to the shape of the main beam, unless the context dictates otherwise. Thus, a "beam pattern" may be a shape of a beam, which is determined by a width of the beam and a pointing direction of the beam. The width of the beam may be defined as an angular width between nulls on opposite sides of the peak, or as an angular width between predetermined power levels on opposite sides of the peak (e.g., a "3 dB beamwidth". The pattern of the transmission beam and the pattern of the receiving beam of which the pointing directions are aligned with each other may be selected as a pair of transceiving beam patterns. That is, when the base station 10 transmits data through a transmission beam having a selected pattern, the wireless communication apparatus 20 may receive the data through a receiving beam having a selected pattern. Hereinafter, an operation of selecting the pattern of the receiving beam by the wireless device 20 according to one or more embodiments will be described.

First, when the base station 10 transmits signals X through a plurality of antenna elements or a plurality of antenna arrays, the wireless device 20 may receive signals Y through at least one antenna element or array. The received signals Y may be results obtained by passing the signals X through a predetermined channel H. A relationship between the transmitted signals X and the received signals Y may be shown in Equation 1:

$$Y = H \cdot X + N \qquad \text{Eqn. (1)}$$

where N is a noise such as white Gaussian noise, Y, X are N may each be a vector and H may be a matrix. The wireless device 20 may receive receiving signals Y by using receiving beams having various patterns formed due to an analog beam sweeping operation. In this case, a channel H may vary according to a pattern of a receiving beam, and a pattern of a receiving beam of the wireless device 20 may be selected based on a state (e.g., a channel capacity) of the channel H.

The wireless device 20 according to an example embodiment may include a plurality of antenna arrays. The wireless device 20 may adjust at least one of a "phase and amplitude of antenna elements" included in the antenna arrays and perform a sweeping operation such that receiving beams generated through use of the antenna arrays have a plurality of patterns at different respective sweeping positions. Herein, adjusting "phase and amplitude of an antenna element" may refer to directly (physically) or virtually (digitally) applying or assigning a phase and amplitude to an antenna element. For example, consider a transmission side antenna array of N elements. If a "transmit signal" is applied to an input path of the antenna array, and the input path is split into N equal length signal paths having equal loss, each leading to one of the N antenna elements, each of the antenna elements may be said to have the same phase and amplitude, where "amplitude" is a measure of signal power. These phases and amplitudes may be used for computing or generating a transmission beam pattern ("transmit" beam pattern). Likewise, in this scenario, on the receive side, each of the antenna elements may be said to have the same phase and amplitude for computing or actually receiving a "receive beam". If a phase shifter and an amplitude adjuster (amplifier or attenuator) is inserted into each signal path leading to one of the N antenna elements, a phase and an amplitude associated with each path may be dynamically adjusted to steer a resulting beam formed by the antenna array. In this case, the phase/amplitude of the antenna elements themselves may be said to be adjusted. The N antenna elements may have different phases/amplitudes by adjusting the phase amplitude of the phase shifter/amplitude adjuster in the connected path. Thereby, the collective beam formed by the N antenna elements may be computed and swept by sequentially adjusting the phases/amplitudes between the antenna elements (e.g., generating a phase gradient between elements). On the receive side, digital beamforming may occur by first measuring the signal power (amplitude) and relative phase received by each of the N antenna elements. The measured amplitudes and phases may then be applied to virtual paths, each having a virtual phase shifter and a virtual amplitude adjuster. Phase shifts and amplitude adjustments in the various virtual paths may then be made to virtually steer a receive beam. In this manner, receive beam patterns may be computed and a receive beam pattern resulting in maximum receive signal power, for example, may be selected. The same virtual beam steering principle may be applied to signals output by sub-arrays.

Hereinafter, an operation of directly adjusting the phase and/or the amplitude of the antenna elements and actually sweeping patterns of receiving beams formed in the antenna arrays in the wireless device 20 will be referred to as an analog beam sweeping operation. Hereinafter, phrases such as "controlling a phase or amplitude of an antenna array", a sub-array, or a sub-array group may be interpreted as controlling phases/amplitudes of antenna elements included in each of the antenna array, the sub-array, and the sub-array group.

The wireless device 20 may generate channel matrices corresponding to respective beam patterns of the antenna arrays on the basis of signals received from the base station 10 due to the analog beam sweeping operation. These channel matrices may be referred to herein interchangeably as "base" channel matrices or "initial" channel matrices (which are distinguishable from "supplemental" channel matrices discussed below). In an example, the wireless device 20 may perform an operation on the base channel matrices corresponding to the respective beam patterns using reference signals included in the signals received due to the analog beam sweeping operation. Herein, the term "beamforming matrix information" may include at least one beamforming matrix. A beamforming matrix may be a block diagonal matrix of which diagonal elements may include beamforming vectors for each of the antenna arrays. Also, the beamforming matrix information may be pre-stored in a codebook format in the wireless device 20. The beamforming matrix information may include information that may be referred to when the wireless device 20 changes (or sweeps) the receiving beam pattern.

The wireless device 20 may generate "supplemental" channel matrices, which may interchangeably referred herein to as "additional" or "combinational" channel matrices, corresponding respectively to receiving beam patterns, which may be formed in between beam patterns formed by the antenna arrays or by predetermined groups of the antenna arrays, using the generated base channel matrices. Hereinafter, in the wireless device 20, an operation of sequentially or randomly applying relative weight values to some of the generated channel matrices, in consideration of potentially formable receiving beam patterns, and virtually sweeping receiving beam patterns that may be formed in the antenna arrays, may be referred to as a digital beam sweeping operation. The wireless device 20 may perform the digital beam sweeping operation and generate the supplemental channel matrices corresponding respectively to the receiving beam patterns, which may be formed in between the beam patterns formed by the antenna arrays or the predetermined groups of the antenna arrays.

In an example embodiment, the analog beam sweeping operation may be said to be performed in an "analog domain", while the digital beam sweeping operation may be said to be performed in a "digital domain".

The wireless device 20 may expand the coverage range encompassed by, and the choices for, receiving beam patterns that may be selected due to the analog beam sweeping operation and the digital beam sweeping operation. Also, the wireless device 20 may select a receiving beam pattern, which may optimally receive a data signal from the base station 10, from among various receiving beam patterns. Thus, the communication performance of the wireless device 20 may be improved.

In an example embodiment, after the wireless device 20 selects an optimum receiving beam pattern in the above-described manner, the wireless device 20 may select a transmission beam pattern for transmitting a signal to the base station 10 or to another wireless device, by using the selected receiving beam pattern. In an example, when beam correspondence is guaranteed, the wireless device 20 may select the same selected receiving beam pattern as the transmission beam pattern and transmit a signal to the base station 10 or another wireless device through a transmission beam having the selected transmission beam pattern. Accordingly, the wireless device 20 may select an optimum transmission beam pattern relatively easily and improve transmission performance.

Figure 2:
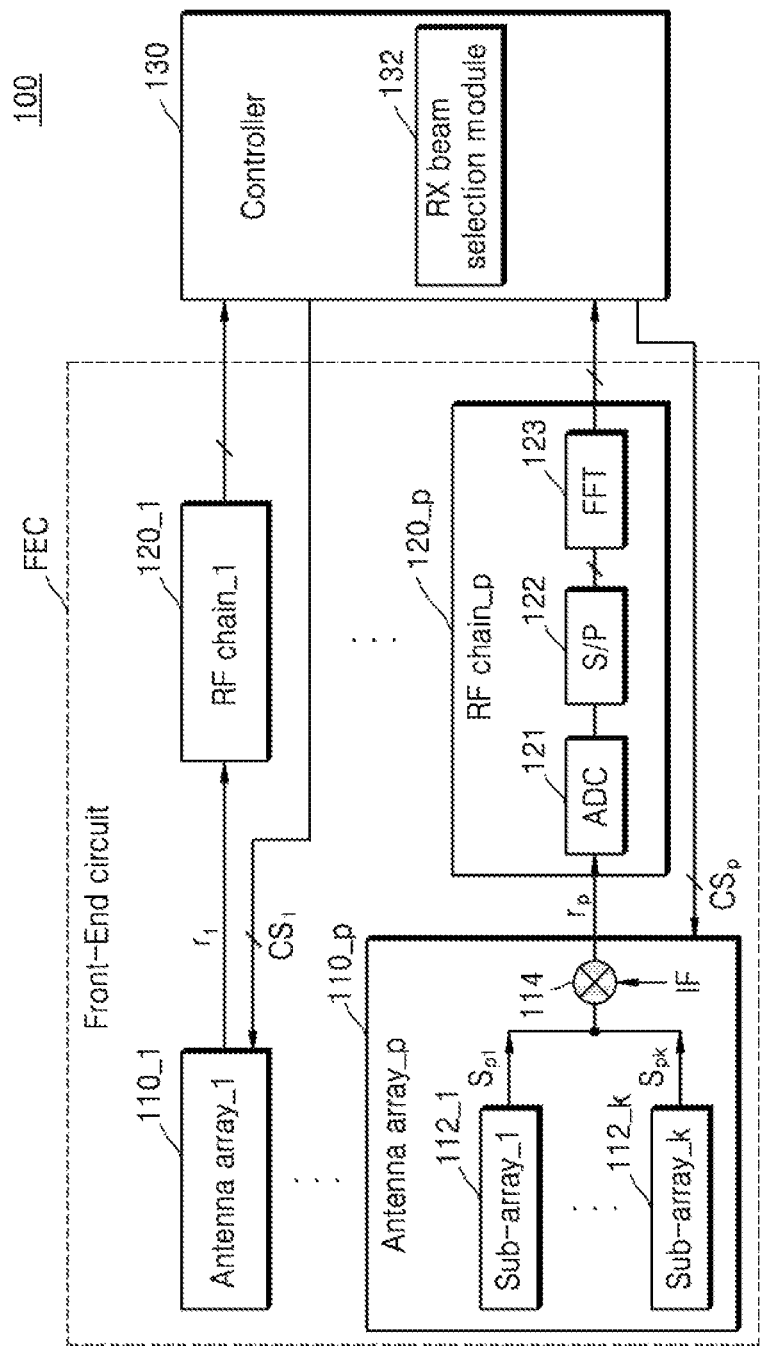
FIG. 2 is a detailed block diagram of a wireless communication apparatus according to an example embodiment.
Figure 3:
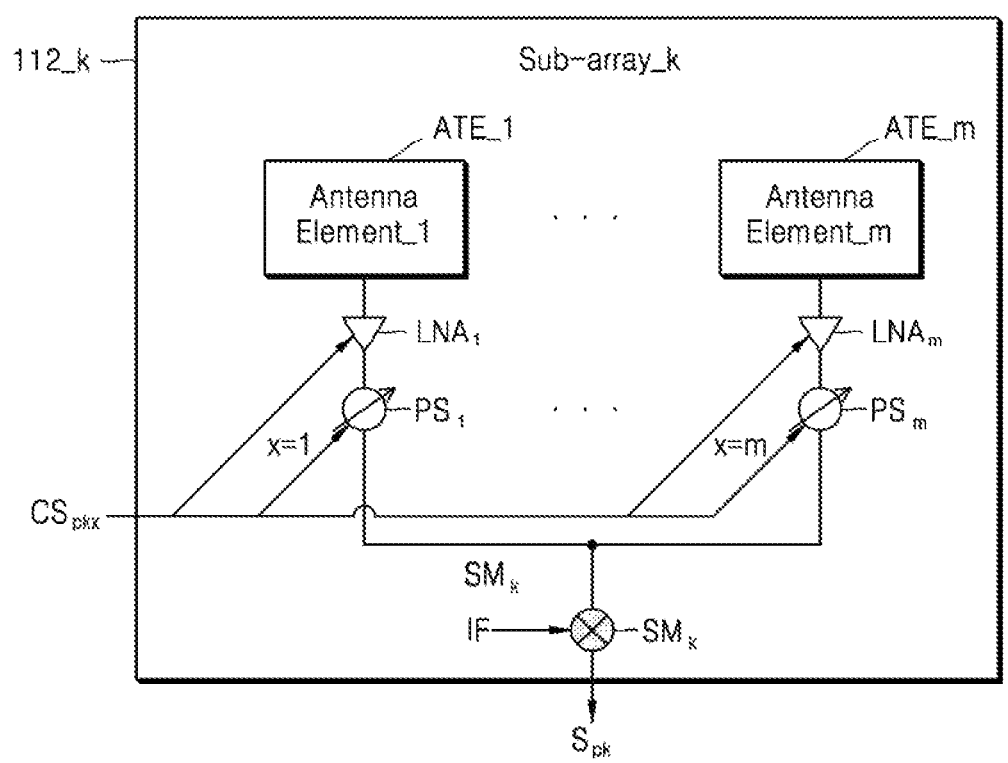
FIG. 3 is a diagram for explaining a configuration of a k-th sub-array.

FIG. 2 is a detailed block diagram of a wireless device 100 according to an example embodiment. FIG. 3 is a diagram for explaining a configuration of a k-th sub-array 112_k.

Referring to FIG. 2, the wireless device 100 may include a front-end circuit FEC and a controller 130. The front-end circuit FEC may include a plurality of antenna arrays, that is, first to p-th antenna arrays 110_1 to 110_p and a plurality of radio-frequency (RF) chains 120_1 to 120_p. Output terminals of the first to p-th antenna arrays 110_1 to 110_p may be connected to RF chains 120_1 to 120_p, respectively. The p-th antenna array 110_p may include a plurality of sub-arrays 112_1 to 112_k and an down-conversion mixer 114. The down-conversion mixer 114 may mix a combined RF signal of the sub-arrays 112_1 to 112_k with an intermediate frequency (IF) signal (e.g. a local oscillator signal) to a baseband signal or a lower IF frequency for subsequent A/D conversion. The sub-arrays 112_1 to 112_k may include a plurality of antenna elements, and phases and/or amplitudes of the antenna elements may be individually controlled to enable an analog beam sweeping operation. The p-th RF chain 120_p connected to the p-th antenna array 110_p may include an analog-to-digital converter (ADC) 121, a serial-to-parallel converter 122, and a fast Fourier transformer (fast fourier transform (FFT) processing circuit) 123. A configuration of the p-th antenna array 110_p may be applied to the remaining antenna arrays, e.g., antenna arrays 110_1 to 110_p-1. A configuration of the p-th RF chain 120_p may be applied to the remaining RF chains, that is, the RF chains 120_1 to 120_p-1.

The controller 130 according to the example embodiment may include a receiving beam selection module (circuit) 132. Each of the controller 130 and receiving beam selection module may be circuitry implemented as a dedicated hardware block, which is designed by logic synthesis, or circuitry implemented as a general purpose processing circuit including at least one processor that executes software instructions read from a memory (e.g., an internal memory (not shown) of controller 230), or may be implemented as a combination of a dedicated hardware block and a general purpose processing circuit. As used herein, the controller 130 may be defined as a device that includes functionality for finding an optimum receiving beam pattern.

The receiving beam selection module 132 according to an embodiment may provide first to p-th control signals $CS_1$ to $CS_p$ to the first to p-th antenna arrays 110_1 to 110_p, respectively, to thereby perform the analog beam sweeping operation. In an example, the receiving beam selection module 132 may provide the p-th control signal $CS_p$ to the p-th antenna array 110_p to control a receiving beam pattern formed in the p-th antenna array 110_p. Hereinafter, a configuration of the k-th sub-array 112_k shown in FIG. 3 will be firstly described for brevity.

Referring to FIG. 3, the k-th sub-array 112_k may include a plurality of antenna elements ATE_1 to ATE_m, a plurality of low-noise amplifiers $LNA_1$ to $LNA_m$, a plurality of phase shifters $PS_1$ to $PS_m$, and a down-conversion mixer $SM_k$. The p-th control signal $CS_p$ may include a control signal CSpkx for controlling a phase and/or amplitude of the k-th sub-array 112_k.

The control signal $CS_{pkx}$ may include signals for controlling gains of the low-noise amplifiers $LNA_1$ to $LNA_m$ connected to each of the sub-arrays 112_k and/or phases of the phase shifters $PS_1$ to $PS_m$ connected to each of the sub-arrays 112_k. The gain control of the LNAs results in signal path amplitude adjustment and thereby produces the antenna element amplitude adjustment described above. A pattern of receiving beams formed in the k-th sub-array 112_k may be changed due to the control signal $CS_{pkx}$. A configuration of the k-th sub-array 112_k may be applied to the other sub-arrays, that is, the sub-arrays 112_1 to 112_k-1 of the p-th antenna array 110_p. Furthermore, the configuration of the k-th sub-array 112_k may be applied to sub-arrays (not shown) included in each of the other antenna arrays, that is, the antenna arrays 110_1 to 110_p-1.

To enable the analog beam sweeping operation, the receiving beam selection module 132 may provide the control signals $CS_1$ to $CS_p$ to the antenna arrays 110_1 to 110_p and change receiving beam patterns formed by the antenna arrays 110_1 to 110_p. In an embodiment, the receiving beam selection module 132 may perform the analog beam sweeping operation for each predetermined sub-array group. In some examples, a sub-array group is two or more sub-arrays. In other examples, however, a sub-array group may have only one sub-array. Thus, a sub-array group may be understood as a unit for dividing sub-arrays included in the antenna arrays 110_1 to 110_p and may be defined as including at least one sub-array. For example, one antenna array may include at least one sub-array group. Alternatively, one sub-array group may be constituted by sub-arrays respectively included in different antenna arrays. For example, beamforming matrix information may be implemented to perform the analog beam sweeping operation in units of sub-array groups. That is, the beamforming matrix information may be set to control a beam sweeping operation on a specific sub-array group in consideration of only some cases that result in a large deformation of a receiving beam pattern, from among all controllable cases of variable phases and/or amplitudes of antenna elements included in the specific sub-array group. An example embodiment in which the sub-array group includes one sub-array will be described below with reference to FIG. 5A, and an example embodiment in which the sub-array group includes a plurality of sub-arrays will be described below with reference to FIG. 9.

The receiving beam selection module 132 may perform the analog beam sweeping operation to receive receiving signals $r_1$ to $r_p$ from the antenna arrays 110_1 to 110_$p$ and generate channel matrix information including channel matrices corresponding to receiving beam patterns for each sub-array group, based on the receiving signals $r_1$ to $r_p$. For example, when the antenna arrays 110_1 to 110_$p$ are each logically divided into two sub-array groups, the receiving beam selection module 132 may generate channel matrices corresponding respectively to the two sub-array groups. That is, the channel matrix information may include first channel matrices indicating a variable channel state according to patterns of receiving beams formed in a first sub-array group and second channel matrices indicating a variable channel state according to patterns of receiving beams formed in a second sub-array group.

The receiving beam selection module 132 may perform a digital beam sweeping operation on at least one group combination, which is determined from sub-array groups, using the channel matrix information and generate supplemental channel matrix information. The supplemental channel matrix information may include supplemental channel matrices indicating a variable channel state according to patterns of receiving beams, which are virtually formed using sub-array groups included in the at least one group combination. For example, when the antenna arrays 110_1 to 110_$p$ are logically divided into three sub-array groups, a first group combination may be set to include the first sub-array group and the second sub-array group, and a second group combination may be set to include the first sub-array group and a third sub-array group. Thus, the receiving beam selection module 132 may perform the digital beam sweeping operation on the first group combination, perform the digital beam sweeping operation on the second group combination, and generate the supplemental channel matrix information.

In an example, the receiving beam selection module 132 may generate changed channel matrices using channel matrices corresponding to the first sub-array group and relative weight value information during the digital beam sweeping operation on the first group combination. The relative weight value information may include a relative weight value, which is determined considering a virtual change of a phase and/or amplitude of antenna elements included in at least one sub-array group in a specific group combination. Subsequently, the receiving beam selection module 132 may generate supplemental channel matrices corresponding to receiving beam patterns, which may be formed by the first sub-array group and the second sub-array group using channel matrices corresponding to the second sub-array group and the changed channel matrices.

The receiving beam selection module 132 according to an embodiment may select receiving beam patterns formed in the antenna arrays 110_1 to 110_$p$ using the base channel matrix information and the supplemental channel matrix information. The receiving beam selection module 132 may detect a channel having best characteristics (an optimum channel) based on the base channel matrix information and the supplemental channel matrix information and control the antenna arrays 110_1 to 110_$p$ to form a receiving beam having a pattern corresponding to the optimum channel. To this end, the receiving beam selection module 132 may update the beamforming matrix information using a result of the digital beam sweeping operation and provide control signals corresponding to the selected receiving beam patterns to the antenna arrays 110_1 to 110_$p$ with reference to the updated beamforming matrix information. The controller 130 may further include a buffer (not shown), which may store beamforming matrix information and relative weight value information. The receiving beam selection module 132 may perform the beam sweeping operation according to the embodiments, with reference to the beamforming matrix information and the relative weight value information stored in the buffer.

The wireless device 100 according to the example embodiment may not only consider receiving beam patterns individually formed by sub-array groups based on limited beamforming matrix information, but also consider receiving beam patterns that may be formed by a combination of the sub-array groups due to a digital beam sweeping operation. Accordingly, since the choices for, and the coverage range encompassed by, selectable receiving beam patterns may be broadened, the wireless device 100 according to the example embodiment may select a receiving beam pattern capable of securing acceptable or superior receiving performance. Also, when beam correspondence of the wireless device 100 is guaranteed, the wireless device 100 may select the receiving beam pattern as a transmission beam pattern thereof and improve transmission performance.

Figure 4:
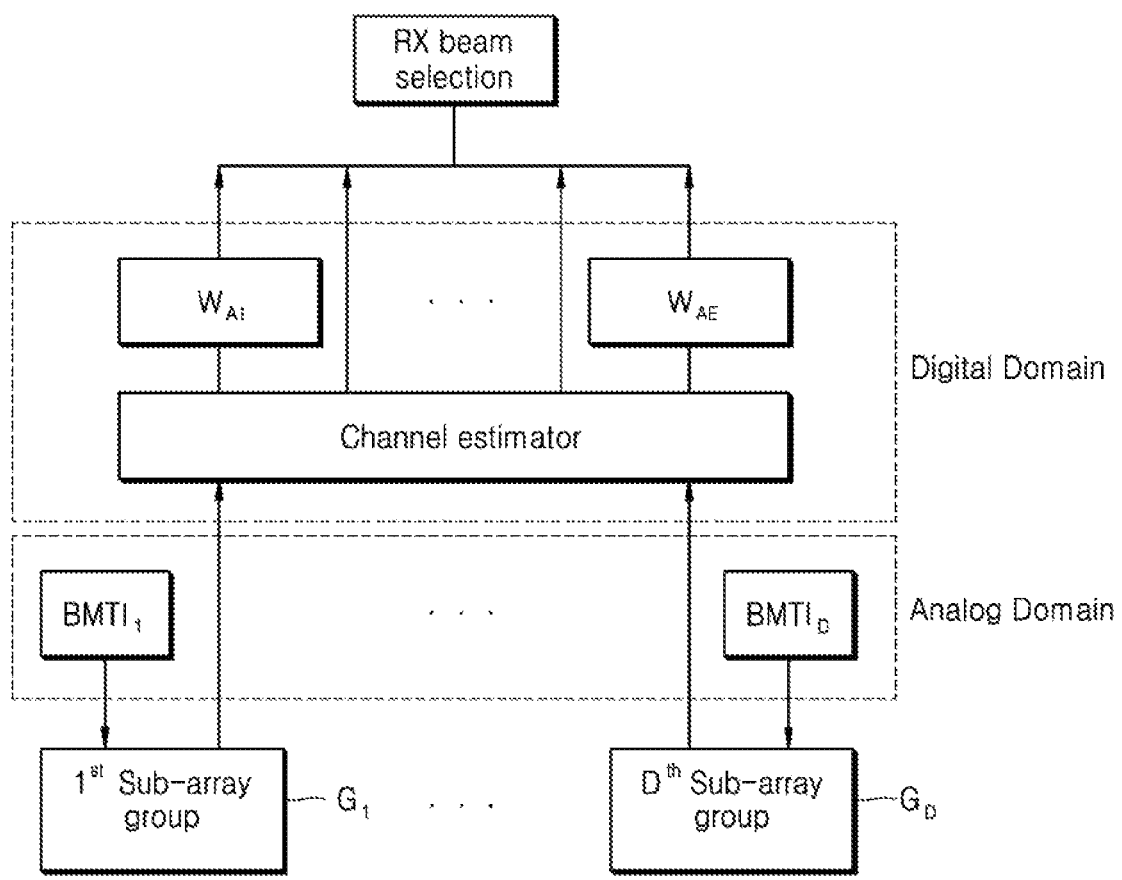
FIG. 4 is a diagram for explaining an operation of selecting a receiving beam pattern in a wireless communication apparatus according to an example embodiment.

FIG. 4 is a diagram for explaining an operation of selecting a receiving beam pattern in a wireless device according to an example embodiment.

Referring to FIG. 4, the wireless device may include D sub-array groups $G_1$ to $G_D$ and perform an analog beam sweeping operation on the D sub-array groups $G_1$ to $G_D$ based on beamforming matrix information $BMTI_1$ to $BMTI_D$ corresponding respectively to the sub-array groups $G_1$ to $G_D$. The beamforming matrix information $BMTI_1$ to $BMTI_D$ may be the same or respectively different. The wireless device may receive signals through receiving beams formed in each of the sub-array groups $G_1$ to $G_D$ due to the analog beam sweeping operation. The above-described analog beam sweeping operation may be performed in an analog domain.

Thereafter, the wireless device may perform a channel estimation operation plural times based on reference signals included in the signals received from the sub-array groups $G_1$ $G_D$ in a digital domain and generate channel matrix information indicating a channel state according to patterns of the receiving beams formed in the sub-array groups $G_1$ to $G_D$. The wireless device may determine group combinations from the sub-array groups $G_1$ to $G_D$ in the digital domain, perform a digital beam sweeping operation using base channel matrices and relative weight values $W_{AI}$ to $W_{AE}$, which correspond respectively to the group combinations, and generate supplemental channel matrix information.

The wireless device may select a receiving beam pattern corresponding to a channel having best characteristics using the channel matrix information and the supplemental channel matrix information.

Figure 5A:
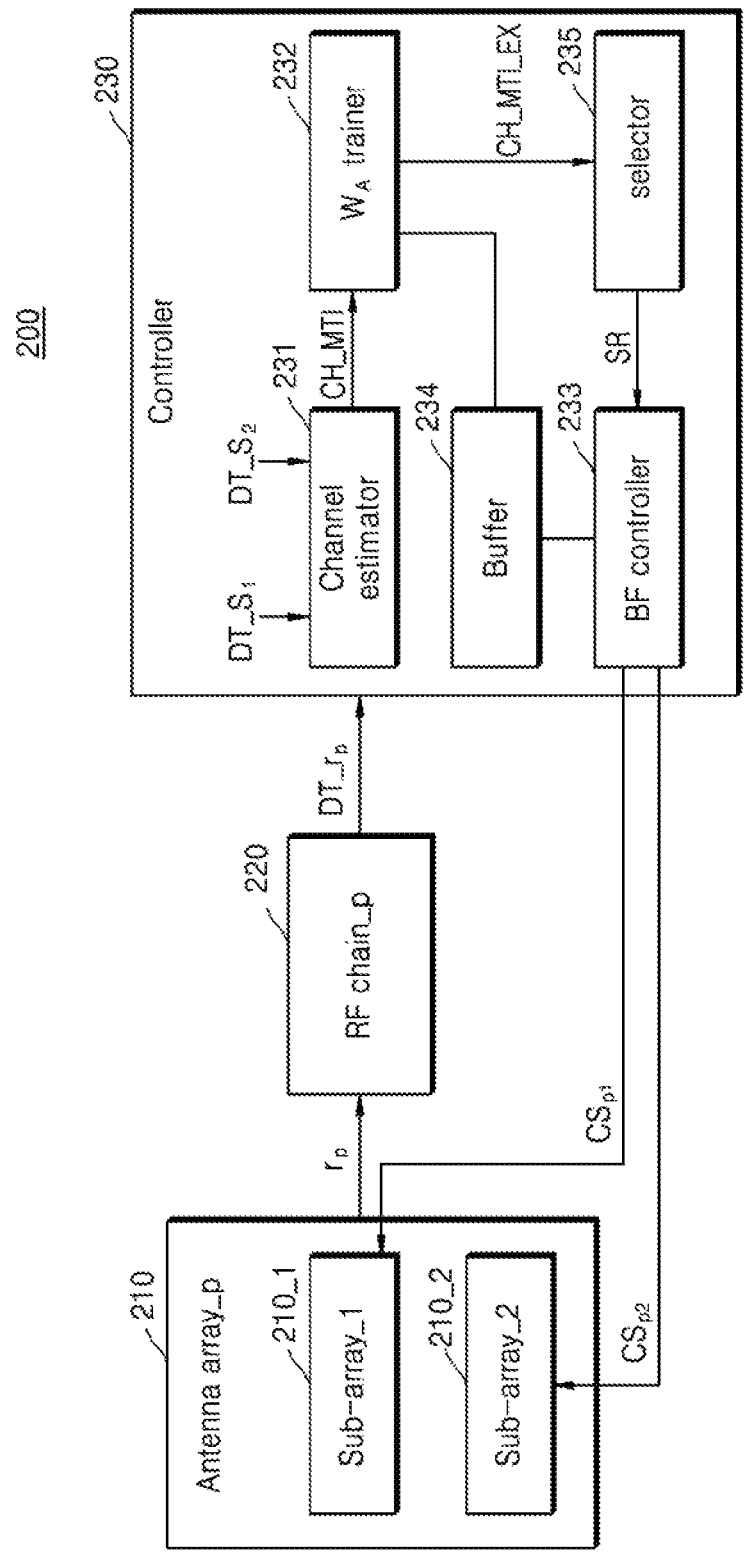
FIG. 5A is a block diagram of a wireless communication apparatus according to an example embodiment.
Figure 5B:
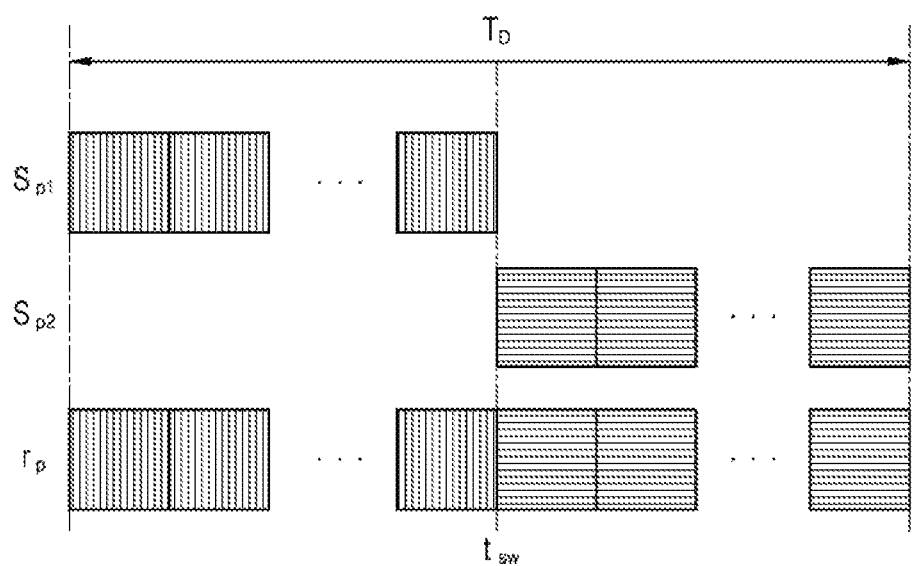
FIG. 5B is a diagram for explaining time points in which signals are received between sub-arrays of the wireless communication apparatus shown in FIG. 5A.

FIG. 5A is a block diagram of a wireless device 200 according to an example embodiment. FIG. 5B is a diagram for explaining time points in which signals are received between sub-arrays of the wireless device 200. FIG. 5A illustrates an embodiment in which the wireless device 200 includes one antenna array 210, which includes two sub-arrays, that is, a first sub-array 210_1 and a second sub-array 210_2. In other embodiments, the wireless device 200 includes two or more antenna arrays as shown in FIG. 2, and each of the antenna arrays may include three or more sub-arrays. Thus, it will be appreciated that the principles of the embodiment described with reference to FIG. 5A may also be applied to other antenna arrays. Further, it is assumed in FIG. 5A that a sub-array group is compose of only one sub-array. Accordingly, one sub-array may denote one sub-array group, but it is readily apparent that the embodiments described with reference to FIGS. 5A to 6B may also be applied to a sub-array group including a plurality of sub-arrays.

As shown in FIG. 5A, the wireless device 200 may include the antenna array 210, an RF chain 220, and a controller 230. The antenna array 210 may include the first sub-array 210_1 and the second sub-array 210_2. The controller 230 may include a channel estimator 231, a relative weight value trainer 232, a beamforming controller 233, a buffer 234, and a selector 235. Note that the channel estimator 231, the relative weight value trainer 232, the beamforming controller 233, and the selector 235 may collectively form an example configuration of the receiving beam selection module 132 of FIG. 2. The beamforming controller 233 may provide a first control signal $CS_{p1}$ and a second control signal $CS_{p2}$ to the first sub-array 210_1 and the second sub-array 210_2, respectively, with reference to beamforming matrix information stored in the buffer 234 during a beam sweeping operation and individually control phases and/or amplitudes of the first sub-array 210_1 and the second sub-array 210_2.

Referring to FIG. 5B, the beamforming controller 233 may set a receiving period of a first signal $S_{p1}$ received through the first sub-array 210_1 different from a receiving period of a second signal $S_{p2}$ received through the second sub-array 210_2. For example, in a predetermined signal receiving period $T_D$, the beamforming controller 233 may enable the first sub-array 210_1 and disable the second sub-array 210_2 to receive only the first signal $S_{p1}$ before a time point '$t_{sw}$,' while the beamforming controller 233 may disable the first sub-array 210_1 and enable the second sub-array 210_2 to receive only the second signal $S_{p2}$ after the time point '$t_{sw}$.' For instance, a sub-array 210 may be disabled by deactivating the LNAs in the signal paths therein, effectively reflecting or terminating the signal energy received by the antenna elements. A sub-array 210 may be enabled by biasing the LNAs to provide normal amplification.

The RF chain 220 may receive a receiving signal $r_p$ output during an analog beamforming operation using the same method as in FIG. 5B and convert the receiving signal $r_p$ into a digital receiving signal $DT\_r_p$ having a format that may be processed by the controller 230. The channel estimator 231 may perform a channel estimation operation using a reference signal included in a first digital signal $DT\_S_1$ and generate first channel matrices respectively corresponding to receiving beam patterns formed by first sub-array 210_1. Also, the channel estimator 231 may perform a channel estimation operation using a reference signal included in a second digital signal $DT\_S_2$ and generate second channel matrices respectively corresponding to receiving beam patterns formed by the second sub-array 210_2.

The channel estimator 231 may provide base channel matrix information CH_MTI including the first channel matrices and the second channel matrices to the relative weight value trainer 232. The relative weight value trainer 232 may generate supplemental channel matrices respectively corresponding to receiving beam patterns, which may be formed using a group combination including the first sub-array 210_1 and the second sub-array 210_2. That is, the relative weight value trainer 232 may generate the supplemental channel matrices in consideration of a relationship between changes in phases and/or amplitudes of the first sub-array 210_1 and the second sub-array 220_2. For example, the relative weight value trainer 232 may sequentially apply pre-set K relative weight values (here, K is an integer equal to or greater than 1) to an N-th channel matrix corresponding to an N-th receiving beam pattern (here, N is an integer equal to or greater than 1) formed by using the first sub-array 210_1 and generate K N-th changed channel matrices. The relative weight values may be pre-set considering a change in the phase and/or amplitude of the first sub-array 210_1 compared to those of the second sub-array 210_2. Thereafter, the relative weight value trainer 232 may sequentially select any one of the N-th changed channel matrices, linearly combine the selected N-th changed channel matrix with an M-th channel matrix corresponding to an M-th receiving beam pattern (here, M is an integer equal to or greater than 1) formed by using the second sub-array 210_2, and generate M-th supplemental channel matrices. In the above-described manner, the relative weight value trainer 232 may perform a digital beam sweeping operation by applying relative weight values to channel matrices corresponding to the first sub-array 210_1 on the basis of each of receiving beam patterns formed in the second sub-array 210_2. Finally, the relative weight value trainer 232 may generate supplemental channel matrix information CH_MTI_EX including supplemental channel matrices respectively corresponding to receiving beam patterns, which may be formed by using the first sub-array 210_1 and the second sub-array 210_2.

As described above, the buffer 234 may store the beamforming matrix information, which is referred to by the beamforming controller 233, and relative weight value information, which is referred to by the relative weight value trainer 232.

The selector 235 may receive the channel matrix information CH_MTI from the channel estimator 231 and receive supplemental channel matrix information CH_MIT_EX from the relative weight value trainer 232.

In an embodiment, when the wireless device 200 includes the antenna array 210, the selector 235 may select a receiving beam pattern having optimum performance using the channel matrix information CH_MTI and the supplemental channel matrix information CH_MIT_EX. That is, the selector 235 may select a receiving beam pattern having best channel characteristics, from among receiving beam patterns that are respectively formed by using the first sub-array 210_1 and the second sub-array 210_2, which are individually controlled due to an analog beam sweeping operation, and receiving beam patterns that may be formed by using the first sub-array 210_1 and the second sub-array 210_2, which are controlled as one group combination due to the digital beam sweeping operation.

The selector 235 may provide a selection result SR of a receiving beam pattern to the beamforming controller 233. The beamforming controller 233 may control the phases and/or amplitudes of the first sub-array 210_1 and the second sub-array 210_2 based on the selection result SR. That is, the beamforming controller 233 may control the first sub-array 210_1 and the second sub-array 210_2 to form receiving beams having a selected pattern. Furthermore, the beamforming controller 233 may update the beamforming matrix information stored in the buffer 234 using the supplemental channel matrix information CH_MT_EX. In addition, the beamforming controller 233 may control the phases and/or amplitudes of the first sub-array 210_1 and the second subarray 210_2 using the updated beamforming matrix information.

In another embodiment, when the wireless device 200 further includes other antenna arrays, the channel estimator 231 and the relative weight value trainer 232 may further generate channel matrices for sub-arrays (or sub-array groups) included in the other antenna arrays and supplemental channel matrices for combination groups. In this case, the selector 235 may receive channel matrices and supplemental channel matrices corresponding respectively to a plurality of antenna arrays and select a receiving beam pattern using the channel matrices and the supplemental channel matrices. A specific operation of the selector 235 when the wireless device 200 includes the plurality of antenna arrays will be described below with reference to FIG. 7.

Figure 6A:
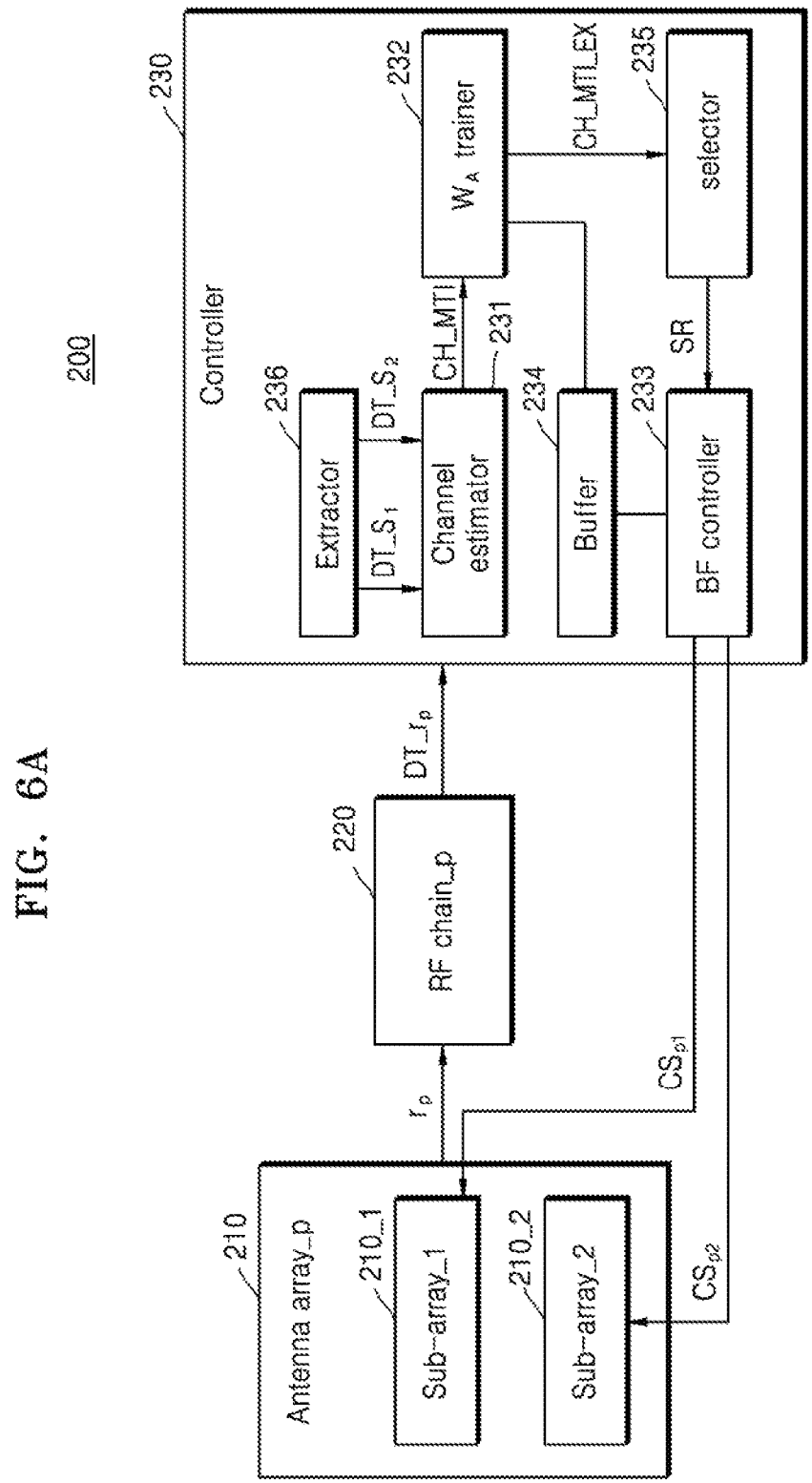
FIG. 6A is a block diagram of a wireless communication apparatus according to an example embodiment.
Figure 6B:
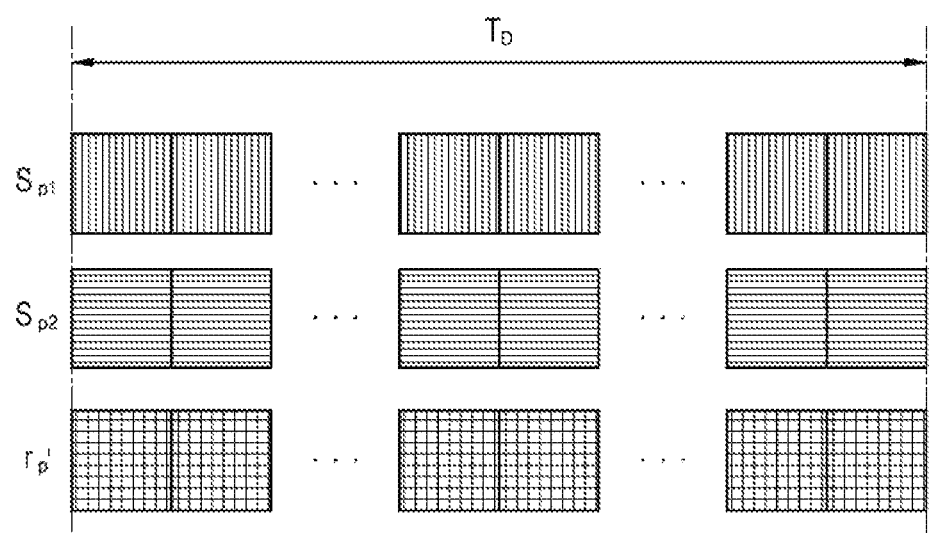
FIG. 6B is a diagram for explaining time points in which signals are received between sub-arrays of the wireless communication apparatus shown in FIG. 6A.

FIG. 6A is a block diagram of a wireless device 200 according to an example embodiment. FIG. 6B is a diagram for explaining time points in which signals are received between sub-arrays of the wireless device 200 shown in FIG. 6A. Hereinafter, the same description as in FIG. 5A will be omitted.

Referring to FIG. 6A, the wireless device 200 may include an antenna array 210, an RF chain 220, and a controller 230. The antenna array 210 may include a first sub-array 210_1 and a second sub-array 210_2. The controller 230 may include a channel estimator 231, a relative weight value trainer 232, a beamforming controller 233, a buffer 234, a selector 235, and an extractor 236. During a beam sweeping operation, the beamforming controller 233 may provide a first control signal $CS_{p1}$ and a second control signal $CS_{p2}$ to the first sub-array 210_1 and the second sub-array 210_2, respectively, with reference to beamforming matrix information stored in the buffer 234 and individually control phases and/or amplitudes of the first sub-array 210_1 and the second sub-array 210_2.

Referring further to FIG. 6B, the beamforming controller 233 may set a receiving period of a first signal $S_{p1}$ received through the first sub-array 210_1 the same as a receiving period of a second signal $S_{p2}$ received through the second sub-array 210_2. For example, in a predetermined signal receiving period $T_D$, the beamforming controller 233 may simultaneously enable the first sub-array 210_1 and the second sub-array 210_2 to simultaneously receive the first signal $S_{p1}$ and the second signal $S_{p2}$. As described above, enable/disable switching operations on the first sub-array 210_1 and the second sub-array 210_2 may be minimized during the beam sweeping operation to minimize noise generated during the enable/disable switching operations. Alternatively, when only one of the first sub-array 210_1 and the second sub-array 210_2 is enabled, power consumption may be reduced during the beam sweeping operation.

The extractor 236 of the controller 230 may extract (or separate) a first digital signal $DT\_S_1$ and a second digital signal $DT\_S_2$ included in a digital receiving signal $DT\_r_p$. For example, the extractor 236 may apply a predetermined matrix, which is determined considering orthogonal characteristics between the first signal $S_{p1}$ and the second signal $S_{p2}$ to the digital receiving signal $DT\_r_p$ and extract (or separate) the first digital signal $DT\_S_1$ and the second digital signal $DT\_S_2$.

Hereinafter, since operation of the controller 230 are the same as described above with reference to FIG. 5A, a description thereof will be omitted.

Figure 7:
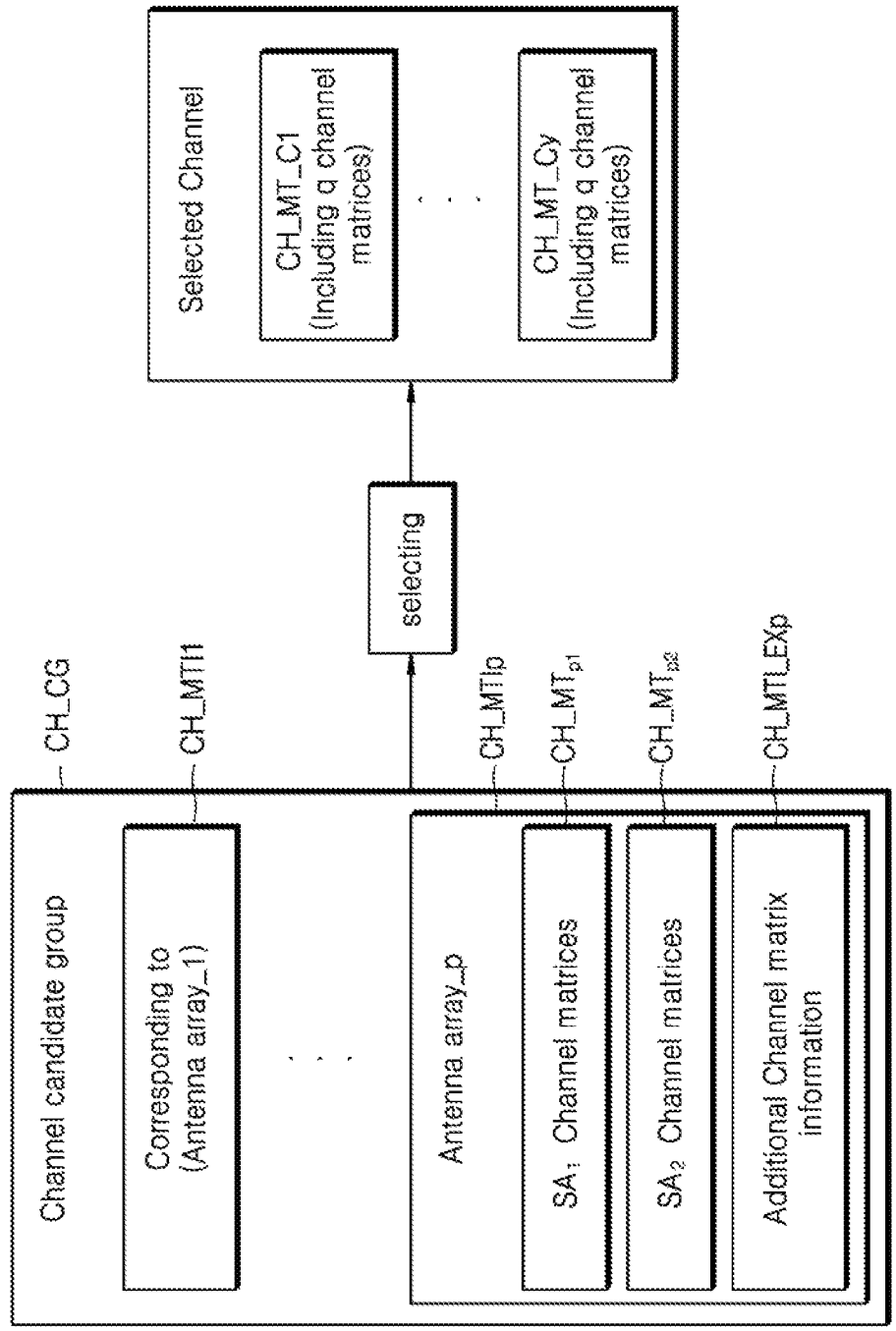
FIG. 7 is a diagram for explaining a method of selecting a receiving beam pattern by a selector of a wireless communication apparatus including a plurality of antenna arrays, according to an example embodiment.

FIG. 7 is a diagram for explaining a method of selecting a receiving beam pattern by a selector (e.g., selector 235 of FIG. 5A or 6A) of a wireless device including a plurality of antenna arrays, according to an example embodiment. FIG. 7 will be described with reference to FIG. 2, and it is assumed for explanatory purposes that the wireless device 100 includes p antenna arrays, that is, first to p-th antenna arrays 110_1 to 110_p, each of the first to p-th antenna arrays 110_1 to 110_p includes two sub-arrays, and a sub-array group includes one sub-array.

Referring to FIGS. 2 and 7, a receiving beam selection module 132 may generate first to p-th channel matrix information CH_MTI1 to CH_MTIp corresponding respectively to first to p-th antenna arrays 110_1 to 110_p due to an analog beam sweeping operation and a digital beam sweeping operation according to embodiments. The p-th channel matrix information CH_MTIp may include first channel matrices $CH\_MT_{p1}$ indicating a channel state according to receiving beam patterns formed in a first sub-array 112_1 due to the analog beam sweeping operation, second channel matrices $CH\_MT_{p2}$ indicating a channel state according to receiving beam patterns formed in a second sub-array 112_2 due to the analog beam sweeping operation, and p-th supplemental channel matrix information CH_MTI_EXp including supplemental channel matrices indicating a channel state according to receiving beam patterns, which may be formed by using the first sub-array 112_1 and the second sub-array 112_2 due to the digital beam sweeping operation. A configuration of the p-th channel matrix information CH_MTIp may be applied to the remaining pieces of channel matrix information CH_MTI1 to CH_MTp-1. The first to p-th pieces of channel matrix information CH_MTI1 to CH_MTIp may be referred to as a channel candidate group CH_CG.

The receiving beam selection module 132 may select a predetermined number of pieces of channel matrix information, out of the first to p-th channel matrix information CH_MTI1 to CH_MTIp. In an example, the predetermined number may be determined according to the number of input ports of the controller 130. For example, when the number of input ports of the controller 130 is q, the receiving beam selection module 132 may select q pieces of channel matrix information out of the first to p-th channel matrix information CH_MTI1 to CH_MTIp, and select and combine one channel matrix from each of the selected pieces of channel matrix information. As a result, the receiving beam selection module 132 may include first channel matrix combination CH_MT_C1 to y-th channel matrix combination CH_MT_Cy, each of which includes q channel matrices.

The receiving beam selection module 132 may calculate a MIMO channel capacity of each of the first to y-th channel matrix combinations CH_MT_C1 to CH_MT_Cy and detect a channel matrix combination corresponding to a channel having best characteristics based on the calculation result. However, since the calculation of the MIMO channel capacity is only an example of a calculation method that is performed to determine each channel characteristic of channel matrix combinations, the inventive concept is not limited thereto, and various metrics may be used to obtain a value indicating each channel characteristic of the channel matrix combinations. The receiving beam selection module 132 may select a receiving beam pattern corresponding to the detected channel matrix combination and control the first to p-th antenna arrays 110_1 to 110_p to form the receiving beam pattern.

Figure 8:
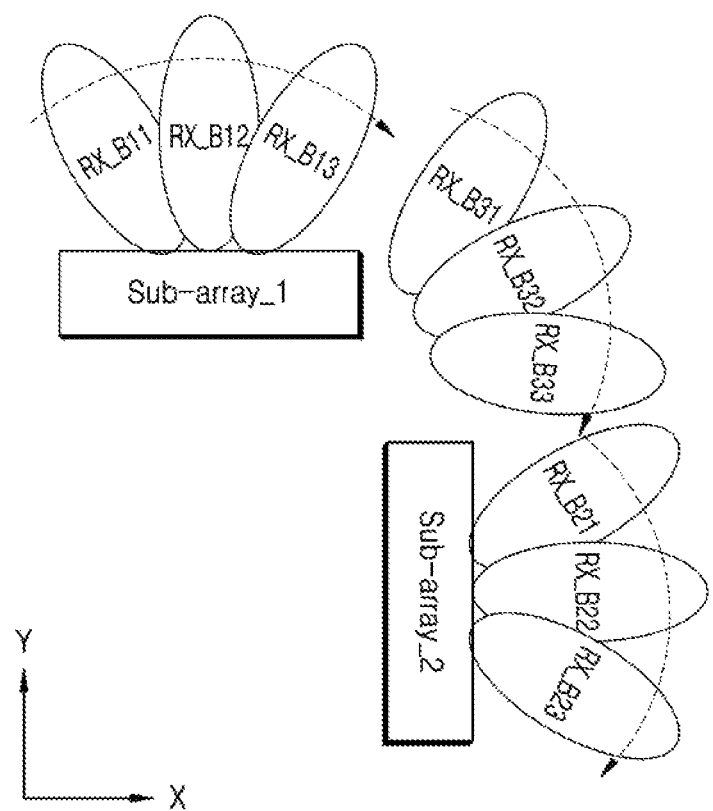
FIG. 8 is a diagram illustrating a beam sweeping operation of a wireless communication apparatus according to an example embodiment.

FIG. 8 is a diagram illustrating a beam sweeping operation of a wireless device according to an example embodiment. In this example, the wireless device may include a first sub-array (sub-array_1) and a second sub-array (sub-array_2). By means of an analog beam sweeping operation, the wireless device may control the first sub-array to form a receiving beam sequentially having patterns RX_B11, RX_B12 and RX_B13, each of which "radiate" (i.e., receive RF signals in the receive direction) with a main beam pointing within an acute angle of the a Y-axis direction. In the analog beam sweeping operation, the wireless device may also control the second sub-array to form a receiving beam sequentially having patterns RX_B21, RX_B22 and RX_B23, each of which radiate with a main beam within an acute angle of an orthogonal X-axis direction in the second sub-array. Also, the wireless device may apply relative weight values to channel matrices corresponding respectively to the patterns RX_B11 to RX_B13 and the patterns RX_B21 to RX_B23 and form a receiving beam sequentially having patterns RX_B31, RX_B32 and RX_B33 virtually (or in a "digital domain") by using receive signal measurements taken by the first sub-array and the second sub-array.

The receiving beam patterns RX_B31 to RX_B33 may each point in a direction between those of the patterns RX_B11 to RX_13 and RX_B21 to RX_B23. Thus, the wireless device may expand a range of receiving beam patterns, which may be selected due to the beam sweeping operation, from 6 patterns RX_B11 to RX_B13 and RX_B21 to RX_B23 to 9 patterns RX_B11 to RX_B13, RX_21 to RX_23, and RX_31 to RX_33. The example of FIG. 8 is only illustrative; other embodiments may produce more or fewer than the three additional receive beam patterns just described.

As described above, the wireless device may expand choices for, and the coverage range encompassed by, selectable receiving beam patterns during the beam sweeping operation, thereby increasing the possibility of selecting a receiving beam pattern having a superior or requisite channel characteristic.

Figure 9:
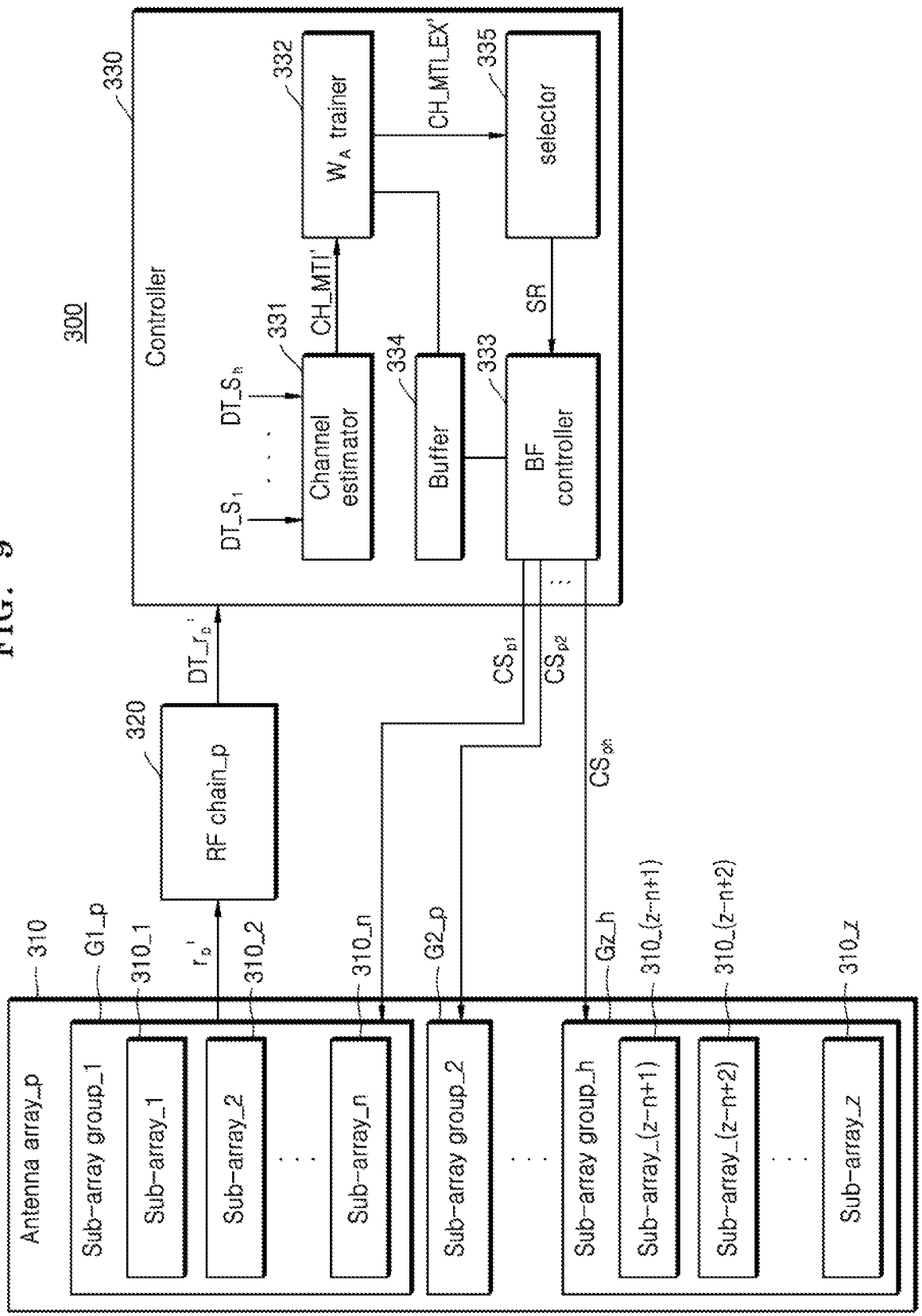
FIG. 9 is a block diagram of a wireless communication apparatus according to an example embodiment.
Figure 10:
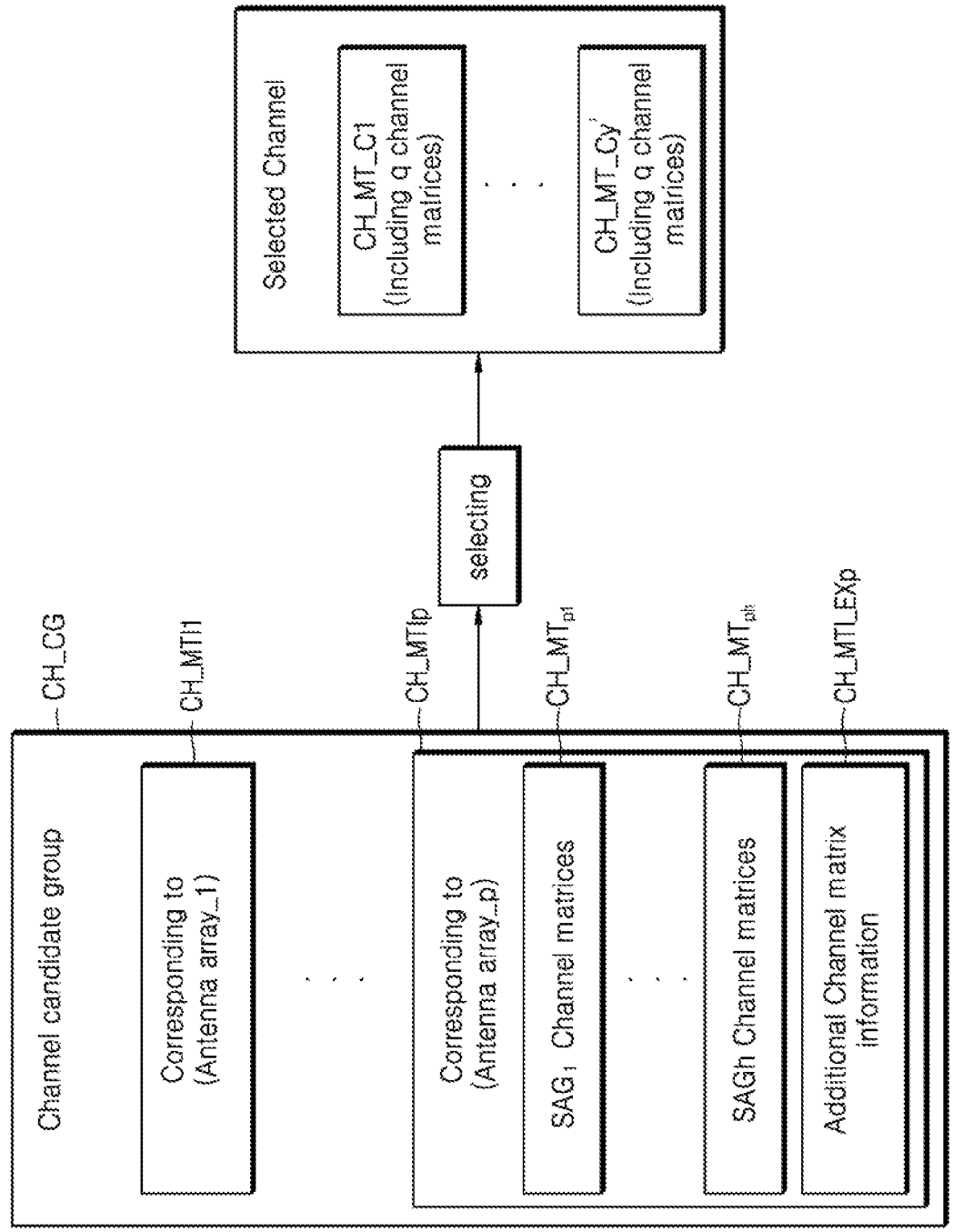
FIG. 10 is a diagram illustrating a method of selecting a receiving beam pattern by a selector of a wireless communication apparatus including a plurality of antenna arrays, according to an example embodiment.

FIG. 9 is a block diagram of a wireless device 300 according to an example embodiment. FIG. 10 is a diagram illustrating a method of selecting a receiving beam pattern, the selecting being performed by a selector 335 of the wireless device 300 including a plurality of antenna arrays, according to an example embodiment. Although FIG. 9 illustrates an example in which the wireless device 300 includes one antenna array, that is, a p-th antenna array 310, the wireless device 300 may include two or more antenna arrays as described below with reference to FIG. 10. Hereinafter, the same description as in FIG. 5A will be omitted.

Referring to FIG. 9, the wireless device 300 may include the p-th antenna array 310, an RF chain 320, and a controller 330. The p-th antenna array 310 may include first to z-th sub-arrays 310_1 to 310_z. The first to z-th sub-arrays 310_1 to 310_z of the p-th antenna array 310 may be logically divided into h sub-array groups G1_p to Gh_p. In an example, a first sub-array group G1_p may include first to n-th sub-arrays 310_1 to 310_n. An h-th sub-array Gh_p may include z-n+1-th to z-th sub-arrays 310_(z-n+1) to 310_z. The remaining sub-array groups G2_p to G(h-1)_p may also include a plurality of sub-arrays (not shown). Also, the numbers of sub-arrays included in the respective sub-array groups G1_p to Gh_p may be the same or different.

The beamforming controller 333 may provide control signals $CS_{p1}$ to $CS_{pz}$ for an analog beam sweeping operation to the sub-array groups G1_p to Gh_p, respectively, and perform the analog beam sweeping operation for each of the sub-array groups G1_p to Gh_p. In an example, the beamforming controller 333 may control the analog beam sweeping operation with reference to beamforming matrix information stored in the buffer 134, and the beamforming matrix information may be pre-set to change a receiving beam pattern for each of the sub-array groups G1_p to Gh_p.

In addition, when the beamforming controller 333 receives a receiving signal rp' through the sub-array groups G1_p to Gz_p, the embodiment of FIG. 5B or FIG. 6B may be applied to this case. That is, as shown in FIG. 5B, receiving periods of receiving signals received from the respective sub-array groups G1_p to Gh_p may be made different. Alternatively, as shown in FIG. 6B, the receiving periods of the receiving signals received from the respective sub-array groups G1_p to Gh_p may be made the same. Since the receiving periods of the receiving signals are described above with reference to FIGS. 5B and 6B, a detailed description will be omitted.

The RF chain 320 may convert a receiving signal $r_p$ into a digital receiving signal $DT\_r_p'$ having a format that may be processed by the controller 330. The digital receiving signal $DT\_r_p'$ may include first to h-th digital signals $DT\_S_1$ to $DT\_S_h$, and the channel estimator 331 may perform a channel estimation operation using a reference signal included in each of the first to h-th digital signals $DT\_S_1$ to $DT\_S_h$, and generate channel matrix information CH_MTI' including channel matrices corresponding respectively to the sub-array groups G1_p to Gh_p.

The channel estimator 331 may provide the channel matrix information CH_MTI' to the relative weight value trainer 332. The relative weight value trainer 332 may perform a digital beam sweeping operation on group combinations, which are determined by the sub-array groups G1_p to Gh_p, and generate supplemental channel matrix information CH_MTI_EX'. For example, when the group combinations include a first group combination including a first sub-array group G1_p and a second sub-array group G2_p and a second group combination including a third sub-army group G3_p and a fourth sub-array group G4_p, the relative weight value trainer 332 may generate first supplemental channel matrices respectively corresponding to receiving beam patterns, which may be formed by the first group combination, and second supplemental channel matrices corresponding to receiving beam patterns, which may be formed by the second group combination. The supplemental channel matrix information CH_MTI_EX' may include the first supplemental channel matrices and the second supplemental channel matrices. Various group combinations may be determined by the sub-array groups G1_p to Gh_p, and relative weight value information that the relative weight value trainer 332 refers to during the digital beam sweeping operation may be set considering various receiving beam patterns that may be formed for each group combination.

Referring further to FIG. 10, the channel estimator 331 and the relative weight value trainer 332 may generate first to p-th channel matrix information CH_MTI1 to CH_MTIp corresponding respectively to first to p-th antenna arrays due to the analog beam sweeping operation and the digital beam sweeping operation according to the embodiments. The p-th channel matrix information CH_MTIp may include first channel matrices $CH\_MT_{p1}$ to h-th channel matrices $CH\_MT_{ph}$ and p-th supplemental channel matrix information $CH\_MTI\_EXp$. The first channel matrices $CH\_MT_{p1}$ may indicate a channel state according to receiving beam patterns formed in the first sub-array group G1_p due to the analog beam sweeping operation, and the h-th channel matrices $CH\_MT_{ph}$ may indicate a channel state according to receiving beam patterns formed in the h-th sub-array group Gh_p due to the analog beam sweeping operation. The p-th supplemental channel matrix information CH_MTI_EXp may include supplemental channel matrices, which indicate a channel state according to receiving beam patterns that may be formed by predetermined group combinations due to the digital beam sweeping operation. A configuration of the p-th channel matrix information CH_M-TIp may be applied also to the remaining channel matrix information CH_MTI1 to CH_MTp-1. The first to p-th channel matrix information CH_MTI1 to CH_MTIp may be referred to as channel candidate group CH_CG.

The selector 335 may select a predetermined number of pieces of channel matrix information out of the first to p-th channel matrix information CH_MTI1 to CH_MTIp. In an example, the predetermined number may be determined according to the number of input portions of the controller 330. For instance, when the number of input ports of the controller 330 is q, the selector 335 may select q pieces of channel matrix information, from among the first to p-th channel matrix information CH_MTI1 to CH_MTIp, and select and combine one channel matrix from each of the selected pieces of channel matrix information. As a result, the selector 335 may include first channel matrix combination CH_MT_C1 to y'-th channel matrix combination CH_MT_Cy', each of which includes q channel matrices.

The selector 335 may calculate a MIMO channel capacity of each of the first to y'-th channel matrix combination CH_MT_C1 to CH_MT_Cy' and detect a channel matrix combination corresponding to a channel having best characteristics based on the calculation result. However, the calculation of the MIMO channel capacity is only an example of a calculation method that is performed to determine each channel characteristic of channel matrix combinations. In other embodiments, various other metrics may be used to calculate a value indicating each channel characteristic of the channel matrix combinations. The selector 335 may select a receiving beam pattern corresponding to the detected channel matrix combination, and control the first to p-th antenna arrays to form a selected receiving beam pattern.

In an embodiment, to reduce the amount of calculation of an operation of selecting the receiving beam pattern, the controller 330 may reduce the number of subcarriers considered in a channel matrix or reduce the size of relative weight value information to reduce the number of receiving beam patterns considered in the digital beam sweeping operation or increase the number of sub-arrays included in a sub-array group. Conversely, to select an optimum receiving beam pattern and further improve communication performance, the controller 330 may increase the number of subcarriers considered in the channel matrix or increase the size of the relative weight value information to increase the number of receiving beam patterns considered in the digital beam sweeping operation or reduce the number of sub-arrays included in the sub-array group.

Figure 11:
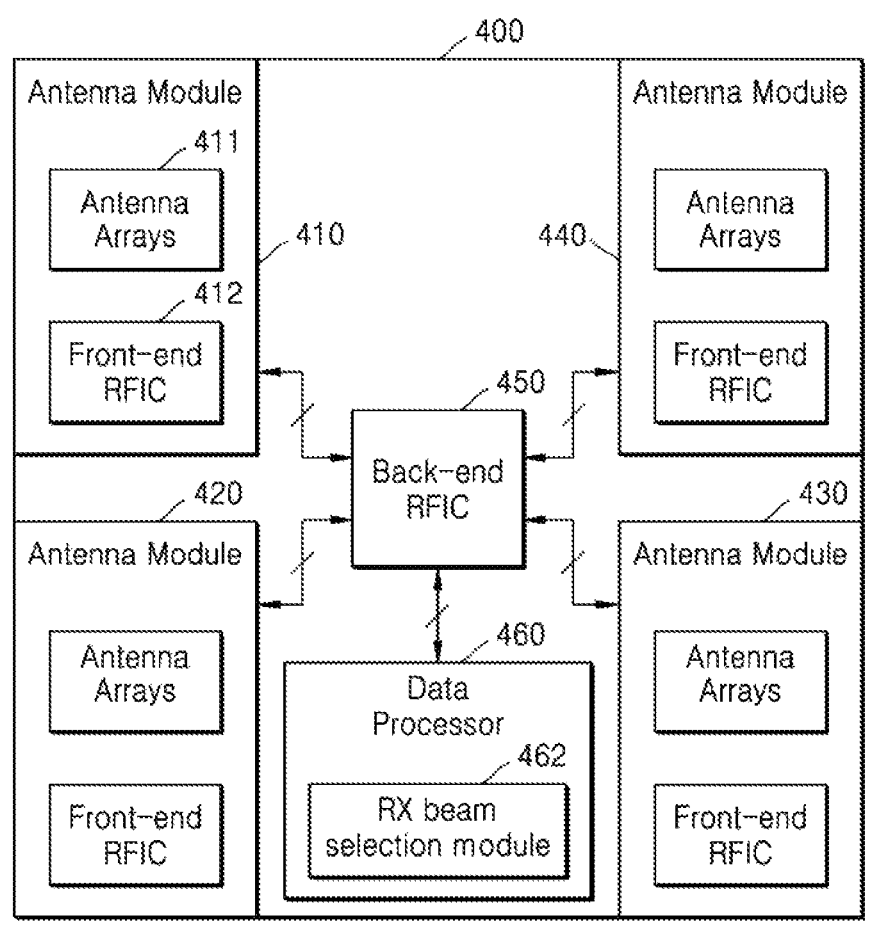
FIG. 11 is a block diagram of a wireless communication apparatus according to an example embodiment.

FIG. 11 is a block diagram of a wireless device 400 according to an example embodiment. As illustrated, the wireless device 400 may include a plurality of antenna modules (e.g., first to fourth antenna modules 410, 420, 430, and 440), a back-end radio-frequency integrated circuit (RFIC) 450, and a data processor 160. The first to fourth antenna modules 410, 420, 430, and 440 may communicate with the back-end RFIC 450, and the back-end RFIC 450 may communicate with the data processor 460. As shown in FIG. 11, the first to fourth antenna modules 410, 420, 430, and 440 included in the wireless device 400 may be located apart from each other.

Each of the first to fourth antenna modules 410, 420, 430, and 440 may include a front-end RFIC. For instance, the first antenna module 410 may include a front-end RFIC 412, and the front-end RFIC 412 may be connected to antenna arrays 411.

The back-end RFIC 450 may process or generate a baseband signal. For example, the back-end RFIC 450 may receive a baseband signal from the data processor 460 and provide a signal generated by processing the baseband signal to at least one of the first to fourth antenna modules 410, 420, 430, and 440. In addition, the back-end RFIC 450 may process a signal, which is received from at least one of the first to fourth antenna modules 410, 420, 430, and 440, generate a baseband signal, and provide the baseband signal to the data processor 460.

The data processor 460 may include a receiving beam selection module 462 and select a receiving beam pattern of the wireless device 400 by using the receiving beam selection module 462. Firstly, the data processor 460 may select at least one antenna module, which will be used to select an optimum receiving beam pattern, from among the first to fourth antenna modules 410, 420, 430, and 440. In this case, the data processor 460 may perform an analog beam sweeping operation of forming a limited number of receiving beam patterns in each of the first to fourth antenna modules 410, 420, 430, and 440 and perform a digital beam sweeping operation of checking a limited number of receiving beam patterns, which may be formed by a combination of antenna modules. The data processor 460 may obtain information indicating a channel state of each of the first to fourth antenna modules 410, 420, 430, and 440 due to the above-described analog beam sweeping operation and digital beam sweeping operation, and select at least one antenna module, which will be used to select an optimum receiving beam pattern, based on the obtained information.

Furthermore, the data processor 460 may perform the analog beam sweeping operation and the digital beam sweeping operation on antenna arrays included in the selected antenna module as in the above-described example embodiments and select the optimum receiving beam pattern.

Figure 12:
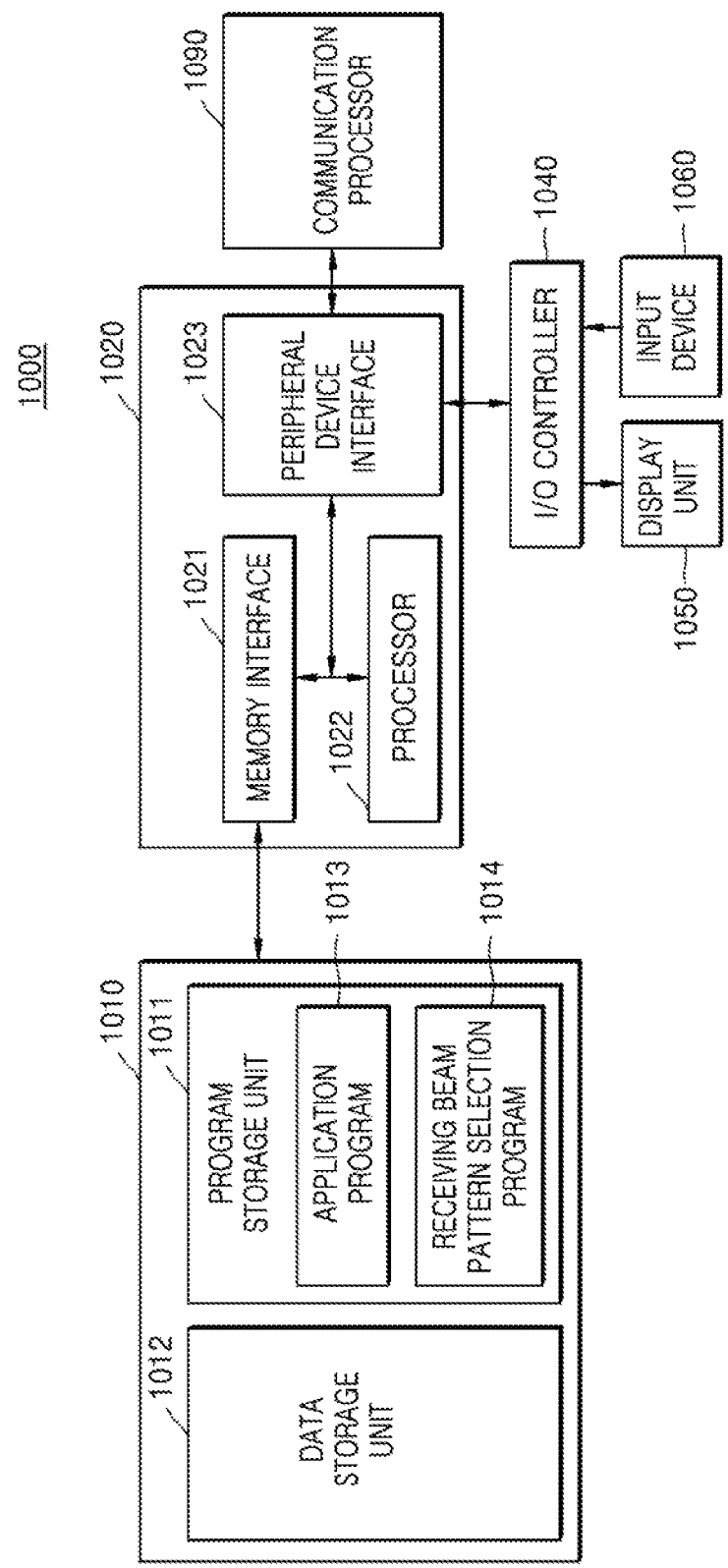
FIG. 12 is a block diagram of an electronic device according to an example embodiment.

FIG. 12 is a block diagram of an electronic device 1000 according to an example embodiment. The electronic device 1000 may include a memory 1010, a processor unit 1020, an input/output (I/O) controller 1040, a display unit 1050, an input device 1060, and a communication processor 1090. Here, the electronic device 1000 may include a plurality of memories 1010. Each component of the electronic device 1000 will now be described.

The memory 1010 may include a program storage unit 1011 configured to store a program for controlling an operation of the electronic device 1000 and a data storage unit 1012 configured to store data generated during the program. The data storage unit 1012 may store data required for operations of an application program 1013 and a receiving beam pattern selection program 1014. The program storage unit 1011 may include an application program 1013 and a receiving beam pattern selection program 1014. Here, the program included in the program storage unit 1011 may be expressed as an instruction set, which is a set of instructions.

The application program 1013 may include an application program, which operates in the electronic device 1000. That is, the application program 1013 may include an instruction of an application that is driven by a processor 1022. According to the embodiments, the receiving beam pattern selection program 1014 may perform an analog beam sweeping operation for each sub-array group and perform a digital beam sweeping operation using channel matrices for each sub-array group. Thus, the coverage range encompassed by receiving beam patterns that may be selected by the receiving beam pattern selection program 1014, and the choices for selectable beam patterns, may be expanded. As a result, the chances of selecting an optimum receiving beam pattern are improved.

A peripheral device interface 1023 may control the connection of an I/O peripheral device of a base station with the processor 1022 and a memory interface 1021. The processor 1022 may control the base station to provide a service corresponding thereto by using at least one software program. In this case, the processor 1022 may execute at least one program stored in the memory 1010 and provide the corresponding service to the executed program.

The I/O controller 1040 may interface between an I/O device (e.g., the display unit 1050 and the input device 1060) and the peripheral device interface 1023. The display unit 1050 may display state information, input characters, moving pictures, and still pictures. For example, the display unit 1050 may display information of an applied program, which is driven by the processor 1022.

The input device 1060 may provide input data, which is generated by the selection of the electronic device 1000, through the I/O controller 1040 to the processor unit 1020. In this case, the input device 1060 may include a keypad including at least one hardware button and a touch pad configured to sense touch information. For example, the input device 1060 may provide touch information (e.g., touch, touch movement, and touch release), which is sensed through the touch pad, to the processor 1022 through the I/O controller 1040. The electronic device 1000 may include the communication processor 1090 that performs communication functions for voice communication and data communication.

While the inventive concept has been particularly shown and described with reference to embodiments thereof, it will be understood that various changes in form and details may be made therein without departing from the spirit and scope of the following claims.

What is claimed is:

1. A method of operating a wireless communication apparatus comprising an antenna array comprising a plurality of sub-arrays, the method comprising:
   sweeping a receiving beam formed in each of the sub-arrays such that the receiving beam has a plurality of receiving beam patterns at a respective plurality of sweeping positions, and receiving a signal through the antenna array at each of the sweeping positions;
   generating base channel matrix information including channel matrices corresponding to the receiving beam patterns for each of the sub-arrays, based on the signal;
   performing a digital beam sweeping operation on at least one sub-array group, the sub-array group being a group combination of the sub-arrays, which is determined using the base channel matrix information, and generating supplemental channel matrix information based on the digital beam sweeping operation; and
   selecting a receiving beam pattern of the antenna array using the base channel matrix information and the supplemental channel matrix information,
   wherein the generating of the supplemental channel matrix information comprises:
   generating changed channel matrices using base channel matrices corresponding to at least one first sub-array included in the at least one group combination and relative weight value information; and
   generating supplemental channel matrices using base channel matrices corresponding to a second sub-array included in the at least one group combination and the changed channel matrices.

2. The method of claim 1, wherein each of the at least one sub-array group comprises antenna elements included in the antenna array and comprises at least one of the sub-arrays.

3. The method of claim 1, wherein the receiving of the signal through the antenna array comprises adjusting at least one of a phase and an amplitude of antenna elements included in the antenna array based on beamforming matrix information.

4. The method of claim 1, wherein the receiving of the signal through the antenna array comprises sequentially enabling the sub-array groups during a sweeping period of the receiving beam and receiving the signal through the enabled sub-array groups.

5. The method of claim 1, wherein the receiving of the signal through the antenna array comprises simultaneously enabling the sub-array groups during a sweeping period of the receiving beam and receiving the signal through the enabled sub-array groups.

6. The method of claim 5, wherein the generating of the supplemental channel matrix information comprises extracting signals for each sub-array group from the received signal.

7. The method of claim 1, wherein the relative weight value information comprises a relative weight value, which is determined in consideration of a virtual change of at least one of phases and amplitudes of antenna elements of the first sub-array.

8. The method of claim 1, wherein the generating of the changed channel matrices comprises sequentially applying K relative weight values included in the relative weight value information to an N-th channel matrix corresponding to an N-th receiving beam pattern formed by using the first sub-array and generating K N-th changed channel matrices,
   wherein the generating of the supplemental channel matrices comprises sequentially selecting any one of the N-th changed channel matrices, linearly combining the selected N-th changed channel matrix with an M-th channel matrix corresponding to an M-th receiving beam pattern formed by using the second sub-array, and generating M-th supplemental channel matrices, wherein M is an integer equal to or greater than 1.

9. The method of claim 1, wherein the supplemental channel matrices correspond to receiving beam patterns virtually formed by the sub-array group.

10. The method of claim 1, further comprising:
    updating beamforming matrix information using a result of the digital beam sweeping operation; and
    providing a control signal corresponding to the selected receiving beam pattern to the antenna array with reference to the updated beamforming matrix information.

11. A method of operating a wireless communication apparatus comprising a plurality of antenna arrays, the method comprising:
performing a beam sweeping operation using a first antenna array including a plurality of sub-arrays, from among the antenna arrays,
wherein the performing of the beam sweeping operation using the first antenna array comprises:
controlling at least one of a phase and an amplitude of each of the sub-arrays of the first antenna array such that a receiving beam formed in the first antenna array has a plurality of receiving beam patterns at a respective plurality of beam sweeping positions;
generating first channel matrix information including channel matrices corresponding to the receiving beam patterns for each of the sub-arrays, based on a signal received through the first antenna array;
performing a digital beam sweeping operation on at least one group combination of selected ones of the sub-arrays, the group combination being determined by using the first channel matrix information, and generating first supplemental channel matrix information;
performing a beam sweeping operation using a second antenna array including a plurality of sub-arrays, from among the antenna arrays, and generating second channel matrix information and second supplemental channel matrix information corresponding to the second antenna array; and
selecting a receiving beam pattern of the wireless communication apparatus using the first channel matrix information, the first supplemental channel matrix information, the second channel matrix information, and the second supplemental channel matrix information.

12. The method of claim 11, wherein the selecting of the receiving beam pattern of the wireless communication apparatus comprises:
selecting a predetermined number of channel matrices from among the first channel matrix information, the first supplemental channel matrix information, the second channel matrix information, and the second supplemental channel matrix information and generating a plurality of channel matrix combinations;
calculating a multiple-input and multiple-output (MIMO) channel capacity of each of the channel matrix combinations; and
selecting the receiving beam pattern corresponding to any one of the channel matrix combinations, based on a calculation result.

13. The method of claim 11, further comprising:
updating beamforming matrix information based on a result of the digital beam sweeping operation on the first antenna array and the second antenna array; and
providing control signals corresponding to the selected receiving beam pattern to the first antenna array and the second antenna array, respectively, with reference to the updated beamforming matrix information.

14. A wireless communication apparatus comprising:
a plurality of antenna arrays, each of which comprises a plurality of sub-arrays;
a plurality of radio-frequency (RF) chains connected to the plurality of antenna arrays, respectively; and
a controller configured to process signals received from the antenna arrays,
wherein the controller controls at least one of phases and amplitudes of antenna elements of each of the sub-arrays, based on a beamforming matrix, and performs an analog beam sweeping operation, and the controller further performs a digital beam sweeping operation in consideration of receiving beam patterns that are formable by a sub-array group, using signals received in the analog beam sweeping operation, the sub-array group being a group combination of selected ones of the sub-arrays, and
wherein the controller generates a plurality of pieces of channel matrix information indicating estimated values of channels corresponding to the signals received due to the analog beam sweeping operation, and selectively applies relative weight values, which are obtained due to the digital beam sweeping operation, to the plurality of pieces of channel matrix information and generates a plurality of pieces of supplemental channel matrix information.

15. The wireless communication apparatus of claim 14, wherein the sub-array group comprises sub-arrays included in a same antenna array.

16. The wireless communication apparatus of claim 14, wherein the receiving beam patterns that are formable by the group combination comprise receiving beam patterns that are not formed in the antenna arrays due to the analog beam sweeping operation.

17. The wireless communication apparatus of claim 14, wherein the controller selects receiving beam patterns of the antenna arrays using the channel matrix information and the supplemental channel matrix information.

* * * * *